United States Patent [19]
Apsit et al.

[11] 3,944,863
[45] Mar. 16, 1976

[54] INDUCTOR MACHINE

[76] Inventors: Voldemar Voldemarovich Apsit, ulitsa V. Latsisa, 2a, kv. 21; Lev Eduardovich Dombur, ulitsa Raunas 45/5, kv. 212; Yan Yanovich Lutsavs, ulitsa Tseplya, 16; Vladislav Alexandrovich Pugachev, ulitsa Maskavas, 266, korpus 5, kv. 73; Mikhail Ivanovich Schukin, ulitsa Ierikju, 43, kv. 41, all of Riga; Sauljus Antanovich Dirzhis, ulitsa Arkhitektu 45, kv. 74, Vilnjus; Iozas Ionovich Karosas, ulitsa Smelju, 5, kv. 23, Vilnjus; Algis Vladislavovich Pashtukas, ulitsa Zhirmunu, 112, kv. 21, Vilnjus; Leonid Borisovich Khlavnovich, ulitsa Gereses Vilt 22, kv. 13, Vilnjus, all of U.S.S.R.

[22] Filed: Apr. 30, 1974

[21] Appl. No.: 465,627

[52] U.S. Cl. ................. 310/168; 310/114; 310/126
[51] Int. Cl.² ......................................... H02K 19/26

[58] Field of Search ................... 310/168–170, 310/216–218, 254–259, 114, 126, 52, 64, 65, 59, 60

[56] References Cited
UNITED STATES PATENTS

| | | | |
|---|---|---|---|
| 447,921 | 3/1891 | Tesla | 310/168 |
| 606,863 | 7/1898 | Gutmann | 310/168 |
| 1,882,487 | 10/1932 | DuPont | 310/65 |
| 2,073,760 | 3/1937 | Schou | 310/168 |
| 3,610,979 | 10/1971 | Thomas | 310/168 |

*Primary Examiner*—Donovan F. Duggan
*Attorney, Agent, or Firm*—Haseltine, Lake & Waters

[57] ABSTRACT

An inductor machine with an armature winding common for all the stator packs and a stationary annular field winding disposed under the armature winding intermediate the toothed rotor packs, differing from the prior art inductor machines in that the field winding is enclosed in a member made up of one or two flanges enveloping the field winding and attached to the end faces of keys equidistantly arranged along the circumference of the inner surface of the machine frame.

2 Claims, 6 Drawing Figures

INDUCTOR MACHINE

The present invention relates to the art of electrotechnics, and more particularly to the construction of non-contact inductor machines; specifically, the invention relates to an improvement in the field winding locating means. Being advantageous in many respects, inductor machines are widely used as HF power sources in various branches of the electrotechnical industry. Among numerous known designs of non-contact inductor machines, the least heavy and cumbersome ones are two-pack inductor machines with a field winding disposed under the armature winding intermediate the rotor packs. These machines, however, suffer from a serious disadvantage, which impedes their wider application, residing in that they are difficult to manufacture and assembly, as well as in the low reliability of the field winding locating means. In some designs, for example, the field winding is suspended, from the armature winding, between the rotor packs, by studs passing therethrough and fastened to the machine frame. The machines so designed are extremely difficult to assemble and disassemble, and axial location of the field winding is not reliable.

Another known design of the field winding locating means makes use of the following structural elements: a ring with a plurality of inwardly directed fins which locate the field winding radially, an annual member shaped as a trough and open at one flat annular face to receive the field winding which is encapsulated therein, the shape of this member being selected such as to limit its axial displacement in one direction, and keys which ensure correct location of the field winding in the other axial direction.

This design suffers from a number of disadvantages which are as follows: difficulties in the manufacture of the finned ring and the trough-shaped annular member, unreliable location of the field winding by the keys which limit its axial displacement, unsuitability of this design for use in internally cooled machines for the finned ring together with the annular member in which the filed winding is contained impede the flow of the cooling air between the packs, and difficult assembly.

It is therefore an object of the present invention to obviate the above disadvantages.

Another object of the invention is to simplify the assembly of the field winding locating means in inductor machines.

Still another object of the invention is the provision of a general-purpose field winding locating means suitable for use in different types of inductor machines.

These objects are attained in that an inductor machine comprises, according to the invention, at least two stator packs with an armature winding common for all the packs being placed in the slots thereof, and an annular field winding disposed under the armature winding intermediate the toothed rotor packs in a member secured to the machine frame by means of keys equidistantly arranged along the circumference of the inner surface of the frame, said member being made up of one or two flanges enveloping the field winding and attached to the end faces of said keys, thereby locating the field winding radially as well as axially.

It is expedient that said flange be made in the form of a disc with a hole in the center thereof and an annular portion around said hole to receive the field winding, the periphery of the disc being provided with a plurality of holes for the disc to be fastened to said keys and a groove between the holes for the flow of cooling air.

A fuller understanding of the nature and objects of the invention will be had from the following detailed description of a preferred embodiment thereof taken in conjunction with the accompanying drawings, wherein.

Figure 1:
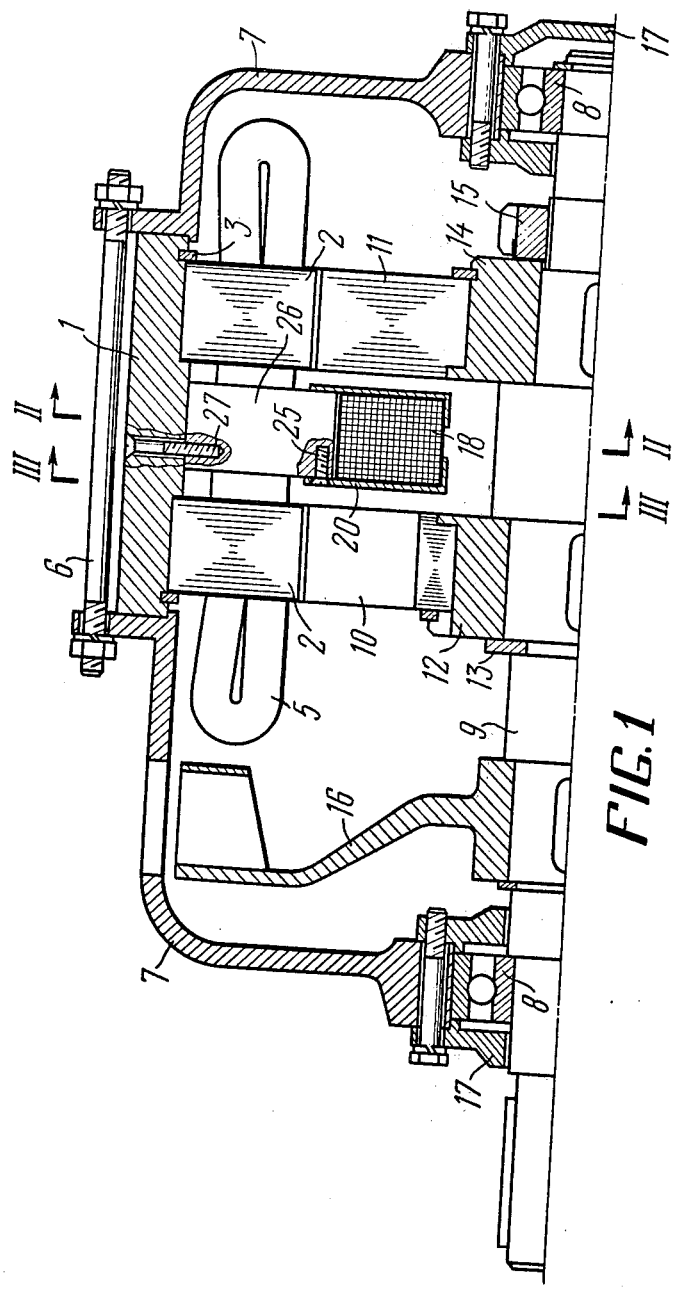
FIG. 1 is a longitudinal section through an inductor machine provided with a field winding locating means, according to the invention.
Figure 3:
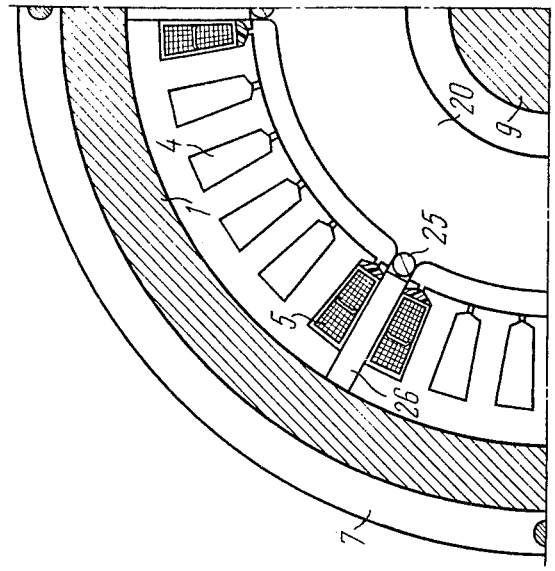
FIG. 3 is a section view taken along line III—III of FIG. 1.
Figure 2:
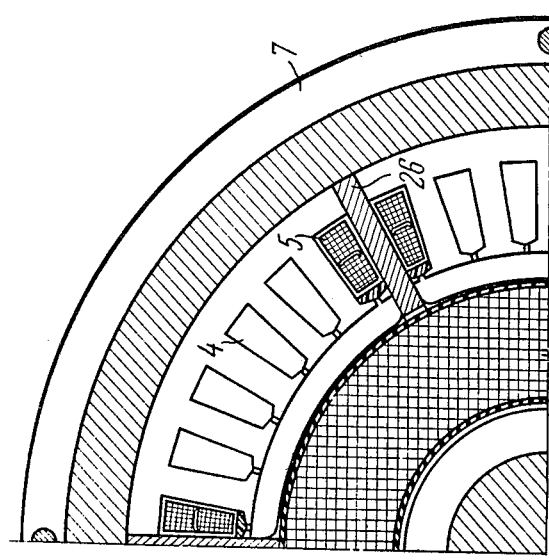
FIG. 2 is a section view taken along line II—II of FIG. 1.

Referring now to the drawings, the inductor machine comprises a frame 1 (FIGS. 1,2,3) attached to which are two stator packs 2 of electrical steel laminations by means of locking rings 3. Placed in slots 4 of the stator packs 2 is a common armature winding 5. Also attached to the frame 1 by means of a stud 6 are two end shields 7 made of non-magnetic material such as silumin. Mounted in the end shields 7 on bearings 8 is a shaft 9 fitted on which are two toothed rotor packs 10 and 11 of eletrical steel laminations. The rotor pack 10 with a metal bushing 12 is received in an interference fit on the shaft 9 and is locked therein by means of a ring 13. The pack 11 with a metal bushing 14 is made detachable to facilitate assembly by being received in a slide fit on the shaft 9 and is locked thereon by means of a lock-nut 15. A ventilator 16 is mounted on the shaft 9, and the bearings 8 are covered by covers 17.

The field winding is made in the form of a stationary annular coil 18 and is disposed under the armature winding 5 intermediate the toothed rotor packs 10 and 11.

The annular coil 18 of the field winding is insulated by micanite tapes 19 and enclosed in a member made up of two similarly designed flanges 20 enveloping the end faces of the coil 18.

Figure 4:
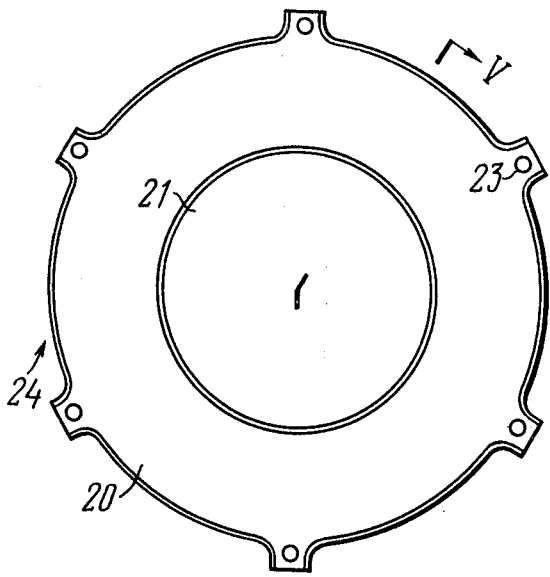
FIG. 4 shows a flange of the field winding annular coil enclosing member, according to the invention.
Figure 5:
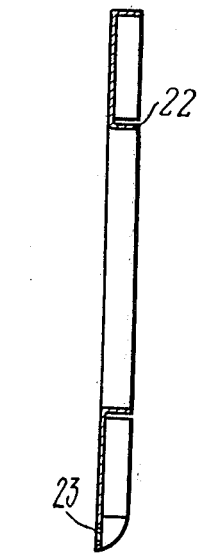
FIG. 5 is a section view taken along line V—V of FIG. 4.

The flange 20 (FIG. 4) is made in the form of a disc with a hole 21 in the center thereof and an annular portion 22 (FIG. 5) on which the coil 18 of the field winding is placed. The periphery of the flange 20 is provided with a plurality of holes 23 for securing the disc, and grooves 24 are made between the holes 23 for the passage of air cooling the field winding coil 18, the cooling air being blown by the ventilator 16.

The flanges 20 are bolted at 25 (FIG. 1) to the end faces of keys 26 equidistantly arranged along the circumference of the inner surface of the frame 1.

The keys 26 are disposed between the stator packs 2 and pass between the coils of the armature winding 5.

The keys 26 are fastened to the frame 1 by means of bolts 27 or by welding. The axial length of the keys 26 being equal to the distance between the stator packs 2, the keys 26 may also serve as spacers locating the stator packs 2 in the frame 1.

The width of the keys 26 does not exceed that of the stator teeth, while their length is such that they slightly protrude above the bores of the stator packs 2 so that they do not impede placing the armature winding 5 in the slots 4 of the stator packs 2.

Figure 6:
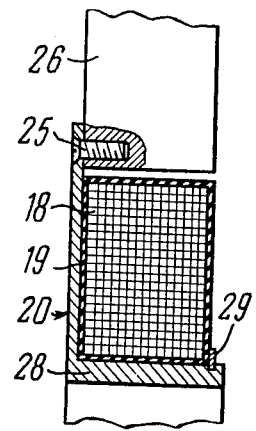
FIG. 6 shows another embodiment of the field winding locating means, according to the invention.

Shown in FIG. 6 is another embodiment of the member enclosing the coil 18 of the field winding, made up of a single flange 20. In this case, the flange 20 is also made in the form of a disc which has an annular portion 28 on which the field winding coil 18 is placed, which annular portion 28 is slightly greater in size than the axial length of the coil 18.

In this embodiment, the annular portion 28 is provided with an annular groove receiving a ring 29 locating the annular coil 18.

The flange 20 is attached to the keys 26 similarly as in the first embodiment.

Thus, the proposed inductor machine in which the field winding is located in a manner described above with reference to the accompanying drawings, features the following advantages.

The field winding locating means is easy to manufacture and assemble due to the use of keys of simplified configuration, formed flanges, and standardized fasteners (bolts, screws, etc).

The structural rigidity and reliability of the field winding locating means are substantially improved.

What is claimed is:

1. An inductor machine comprising, a frame, at least two stator packs attached to said frame and carrying a common armature winding, a toothed rotor having a number of packs corresponding to that of the stator packs, a field winding in the form of stationary annular coils disposed under said armature winding between said rotor packs, at least one mounting flange fixed to the frame and adjoining side faces of said annular coils, fastening means fixing the mounting flange to said frame and including individual prism-shaped keys arranged equidistantly on said frame at the inner surface thereof, said prism-shaped keys having axial holes for the fastening of said flange thereto, said flange being in the form of a disc having a central opening and an annular portion around the central opening receiving said field winding, said disc having a plurality of holes along the periphery thereof for receiving fastening means engaging said holes in said keys, said flange have grooves in the spaces between said holes in said disc for the axial flow of cooling air.

2. An inductor machine as claimed in claim 1 wherein said holes in the keys are threaded and said fastening means are threaded fasteners.

* * * * *